United States Patent
Sandi et al.

[11] Patent Number: 6,110,621
[45] Date of Patent: Aug. 29, 2000

[54] CARBONS FOR LITHIUM BATTERIES PREPARED USING SEPIOLITE AS AN INORGANIC TEMPLATE

[75] Inventors: Giselle Sandi, Wheaton; Randall E. Winans, Downers Grove; K. Carrado Gregar, Naperville, all of Ill.

[73] Assignee: The University of Chicago, Chicago, Ill.

[21] Appl. No.: 09/198,356

[22] Filed: Nov. 24, 1998

[51] Int. Cl.[7] .............................. H01M 4/58; H01M 4/00; C01B 31/00
[52] U.S. Cl. .................................. 429/231.8; 429/231.95; 429/322; 429/323; 423/414; 423/421
[58] Field of Search .......................... 429/231.95, 231.8, 429/322, 323, 326, 338; 423/414, 421

[56] References Cited
PUBLICATIONS

Sandi, G; Winans, RE; Carrado, KA; Johnson, CS; Novel Carbonaceous Materials for Lithium Secondary Batteries; Conference: Z. Intnl. Symposium on New Materials for Fuel Cells and Modern Battery Systems Montreal (Canada), pp. 6–10, Jul. 1997.

Primary Examiner—Maria Nuzzolillo
Assistant Examiner—Angela J. Martin
Attorney, Agent, or Firm—Emrich & Dithmar

[57] ABSTRACT

A method of preparing an anode material using sepiolite clay having channel-like interstices in its lattice structure. Carbonaceous material is deposited in the channel-like interstices of the sepiolite clay and then the sepiolite clay is removed leaving the carbonaceous material. The carbonaceous material is formed into an anode. The anode is combined with suitable cathode and electrolyte materials to form a battery of the lithium-ion type.

30 Claims, 4 Drawing Sheets

STRUCTURE OF SEPIOLITE. A: STRUCTURAL BLOCK COMPOSED OF TWO TETRAHEDRAL SHEETS AND A CENTRAL OCTAHEDRAL MAGNESIUM SHEET. B: CROSS-SECTION OF AN ASSEMBLY OF STRUCTURAL BLOCKS FORMING AN IDEAL SEPIOLITE FIBER.

STRUCTURE OF SEPIOLITE. A: STRUCTURAL BLOCK COMPOSED OF TWO TETRAHEDRAL SHEETS AND A CENTRAL OCTAHEDRAL MAGNESIUM SHEET. B: CROSS-SECTION OF AN ASSEMBLY OF STRUCTURAL BLOCKS FORMING AN IDEAL SEPIOLITE FIBER.

XRD OF A CARBON SAMPLE DERIVED FROM SEPIOLITE/PROPYLENE

VOLTAGE PROFILE OF A CARBON ELECTRODE DERIVED FROM SEPIOLITE/PROLYLENE
VOLTAGE LIMIT: 0 TO 2.5 V; CURRENT RATE: C/20

CAPACITY PERFORMANCE AS A FUNCTION OF CYCLE NUMBER OF A CARBON ELECTRODE DERIVED FROM SEPIOLITE/PROPYLENE. VOLTAGE LIMIT: 0 TO 2.5 V; CURRENT RATE: C/20

CARBONS FOR LITHIUM BATTERIES PREPARED USING SEPIOLITE AS AN INORGANIC TEMPLATE

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

The lithium-ion battery market has been in a period of dynamic growth ever since Sony introduced the first commercial cell in 1991. The lithium-ion battery system has become increasingly popular in applications such as portable computers, camcorders and cellular phones. As new materials are developed, cost reduction should spur growth in new applications. Carbonaceous materials have been used as anode electrodes, thus avoiding the dendritic growth of metallic lithium upon charging, prolonging the cycle life of a whole cell and improving the reliability. On the other hand, a carbon anode may lower the specific energy density of a cell due to both a high reversible potential and a limited amount of lithium uptake in the carbon matrix. These two factors vary with the type of carbon material. Thus far, carbon materials such as natural graphite, cokes, carbon fibers, non-graphitizable carbon, and pyrolitic carbon have been investigated, but critical parameters such as surface area and porosity are difficult to predict and control for these materials.

Previously, disordered carbons with more predictable properties have been prepared using inorganic templates containing well-defined pore sizes, as reported in *Journal. Electrochem. Society* 1996, 143, L95 and Res. Soc. Symp. Proc., *Macroporous and Microporous Materials* 1996, 431, 39. The carbons have been tested in electrochemical cells as anodes in lithium secondary batteries. They deliver high specific capacity (a measure of the power in mAh/g) and display excellent performance in terms of the number of cycles runs, as reported in *Journal New Mat. Electrochem. Systems* 1998, 1, 83. Although the performance of the clay-derived carbons is excellent, there is still a need to improve the efficiency of the synthetic process without sacrificing electrochemical performance of the resulting carbons. We have discovered that using a particular clay called sepiolite as an inorganic template to load organic precursors has produced superior results. Sepiolite has fibers of 0.2 to 2 $\mu$m in length, 100×300 Å in width and a thickness of 50 to 100 Å. The fibrous structure is composed of ribbons with two sheets of tetrahedral silica units, linked by oxygen atoms to a central octahedral sheet of magnesium so that the tetrahedral sheet of silicon is continuous, but with the directions of the apical extremes of the tetrahedral sheets of silica inverted after every six tetrahedral units. This spatial configuration determines the presence of channels oriented in the longitudinal direction of the fibers.

SUMMARY OF THE INVENTION

An object of the present invention is to prepare an anode material using sepiolite clay having channel-like interstices in its lattice structure as a template for depositing carbonaceous material for later use as an anode in a lithium battery.

Another object of the invention is to prepare an anode of compacted disordered carbon having a particle distribution corresponding to the sepiolite channel-like structure.

Yet another object of the invention is to provide a battery having a lithium cathode in which the anode is separated from the cathode by an electrically non-conductive material and an electrolyte, the anode including compacted disordered carbon having a particle distribution corresponding to sepiolite channel-like structures.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
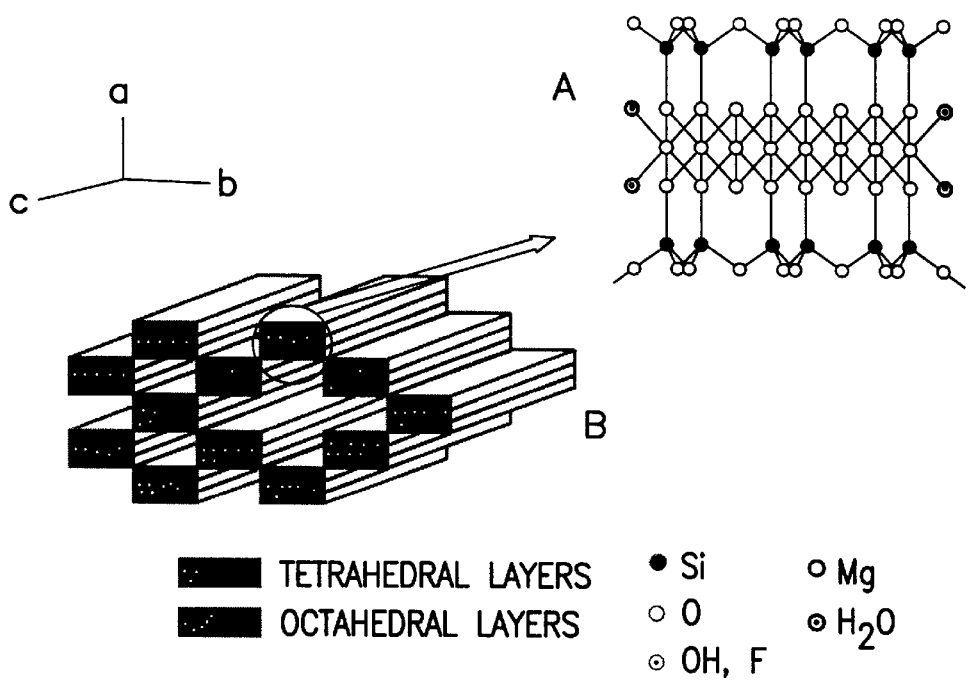
FIG. 1A is an end view showing the structural representation of the sepiolite structure showing the channels determined by the two tetrahedral sheets on opposite sides of a octahedral magnesium sheet and FIG. 1B is a cross-section of an assembly of structural blocks forming an ideal sepiolite fiber.

Referring now to FIG. 1, there is shown a structural representation of sepiolite, where the channels between the blocks are filled by zeolitic-like and magnesium coordinated-water molecules. The known cross-section of these channels is 3.6 Å×10.6 Å. The channels are suitable for controlling the structure of organic compounds. It has been suggested that the strong Brønsted acidity due to bound water in sepiolite makes possible the polymerization initiation of isoprene at room temperature. Others, prior to our invention, polymerized pyrrole in the intracrystalline tunnels of sepiolite in the presence of halogen molecules in order to prepare a conducting composite with electrical conductivity and ordered structure. Our invention relates to the synthesis of carbonaceous materials that are derived from ethylene or propylene upon incorporation in the vapor phase in the channels of sepiolite, taking advantage of the strong Brønsted acidity in the channels to polymerize olefins. Previously, we employed templates of pillared clays (PILCs). These modified clays have inorganic supports between the layers that help to prevent the collapse of the layers upon heat treatment. After elimination of the inorganic matrix via demineralization, the layered carbons showed holes due to the pillaring $Al_{13}$ cluster where lithium diffusion may be able to occur. Our present invention is an improvement over our prior work due to the presence of channels in the structure of sepiolite, allowing the pillaring process to be eliminated and the carbon loading enhanced.

Sepiolite was obtained from Yunclillos (Toledo, Spain), provided by TOLSA, S.A. Ethylene and propylene (AGA, 99.95%) were loaded and pyrolyzed in the gas phase in one step. A three-zone furnace was used. Quartz boats containing sepiolite were placed within a quartz tube. The tube was initially flushed with nitrogen for about 3 hours. The gas was then switched to propylene or ethylene and the gas flow was kept about 5 cm³/min. Mixtures of propylene and ethylene would also be satisfactory. The temperature of the oven was gradually increased from room temperature (about 5° C./min) to 700° C. The oven was then held at that target temperature for 4 hours.

The clay from the loaded/pyrolyzed sepiolite sample was removed using HF, previously cooled at 0° C. to passivate the exothermic reaction. HCl could also be used or a mixture of HF and HCl. The resulting slurry was stirred for about one hour. It was then rinsed to neutral pH and refluxed with concentrated HCl for 2 hours. The sample was washed with distilled water until the pH was >5 to ensure that there was no acid left. The resultant carbon was oven dried overnight at 120° C. Typically, the carbon prepared in accordance with the present invention had a surface area of about 28 sq. m/g and an average pore radius of about 6.6 Å. The micropore volume was about 2.11 cu-cm/gm, the micropore area was about 4.01 sq. m/gr and the meso-pore area was about 24 sq. m/gr.

X-ray powder diffraction (XRD) patterns of sepiolite, sepiolite/organic composite and carbons were determined using a Rigaku Miniflex, with Cu $K^a$ radiation and a NaI detector at a scan rate of 0.5° 2Θ/min.

Electrodes were prepared using 90% by weight of the carbonaceous materials, and a binder solution made of polyvinylidene fluoride (PVDF, Aldrich, 99+%) dissolved in N-methyl-pyrrolidinone (NMP, Aldrich, 99+%). An excess of NMP was added to make a slurry. The slurry was oven-dried at 120° C. overnight. This resulting powder was used to make pellets in carbon-steel dies. About 20–30 milligrams of carbon was put into the die and evened-out with the plunger. The die and plunger were put into the press and were pressed at about 5000 psi. Carbon electrode pellets were dried at 80° C. in a vacuum oven inside a dry room prior to assembly.

Figure 2:
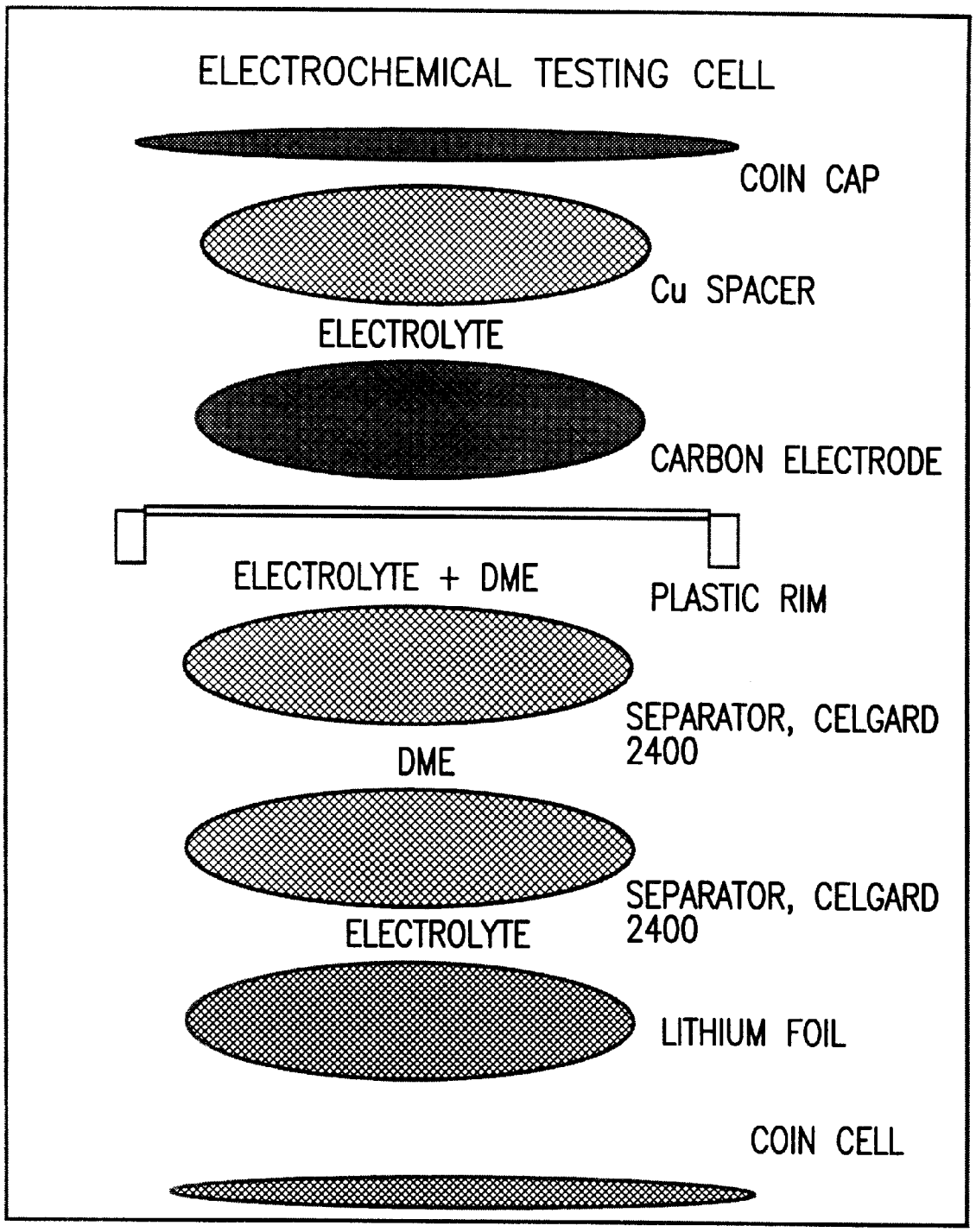
FIG. 2 is an exploded representation of a coin cell hardware and assembly.

The button cells were 1225, either from Ray-O-Vac or Eveready Battery Company, nickel-plated stainless steel and assembled in a dry room. The dual electrode configuration in these cells uses metallic lithium as the anode. The electrolyte was 1M $LiPF_6$ dissolved in 50 vol. % ethylene carbonate (EC) & 50 vol. % dimethylcarbonate (DMC) obtained as a solution from FMC Lithium Division (Gastonia, N.C.). Cells fabricated are cathode capacity limiting and contain metallic lithium (FMC) foil (0.008"; 0.203 mm) as the anode. To help wet the lithium surface with the electrolyte one drop of 1,2-dimethoxyethane (DME, 99.9+%, Aldrich) was added to the cell. Two Celgard 2400 separators (Hoechst-Celanese, Charlotte NC), dried at 80 ° C., were placed on top of the wetted lithium foil. More drops of electrolyte and only one drop of DME was added. The cells were allowed to sit undisturbed for about 15 minutes to let the DME evaporate. The carbon electrode pellet was placed against the separator, and a copper-foil spacer was situated on top of the carbon electrode pellet. The spacer acted as both a current collector and also filled the button cell space, depending on the thickness of the pellet. The button cell can was placed over the rest of the cell and against the grommet. The cell as illustrated in FIG. 2, was loaded onto a die spot for crimp-sealing, and was subsequently pressed to a stack height of 0.061" and 2000 psi. After crimping, the cell voltage was immediately checked for shorts. Those sealed button cells which displayed a voltage of 2.5 V or higher were transported for electrochemical testing on an Arbin 2400 station cell cycler.

Figure 3:
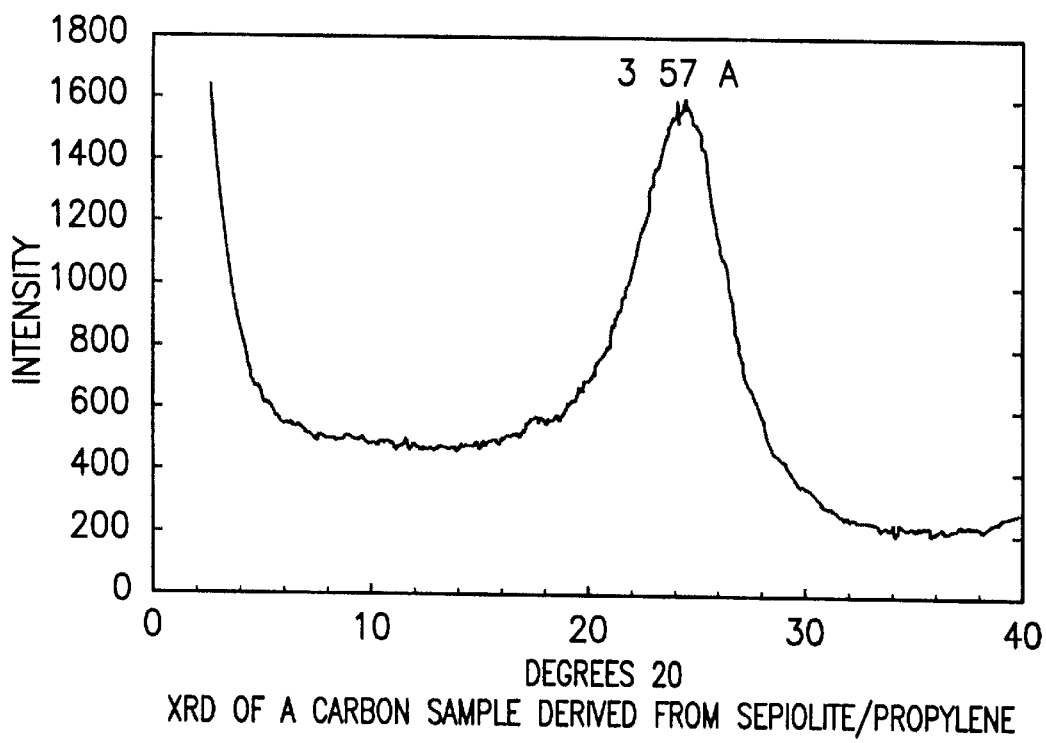
FIG. 3 is a graphical representation of the x-ray diffraction pattern of a carbon sample derived from a sepiolite/polypropylene structure.

The percentage organic loading in the sepiolite, calculated by TGA, corresponded to 47.0%, when polypropylene was used. The yield of carbon with respect to the initial clay weight, was 53%, which is much higher than the yields obtained from the pillared clay approach (3% with respect to the initial pillared clay weight). FIG. 3 shows an XRD pattern of the carbon synthesized by incorporating propylene within sepiolite in the gas phase. The broad peak at 3.57 Å corresponds to the 002 reflection of graphite and is indicative of a disordered system.

Figure 4:
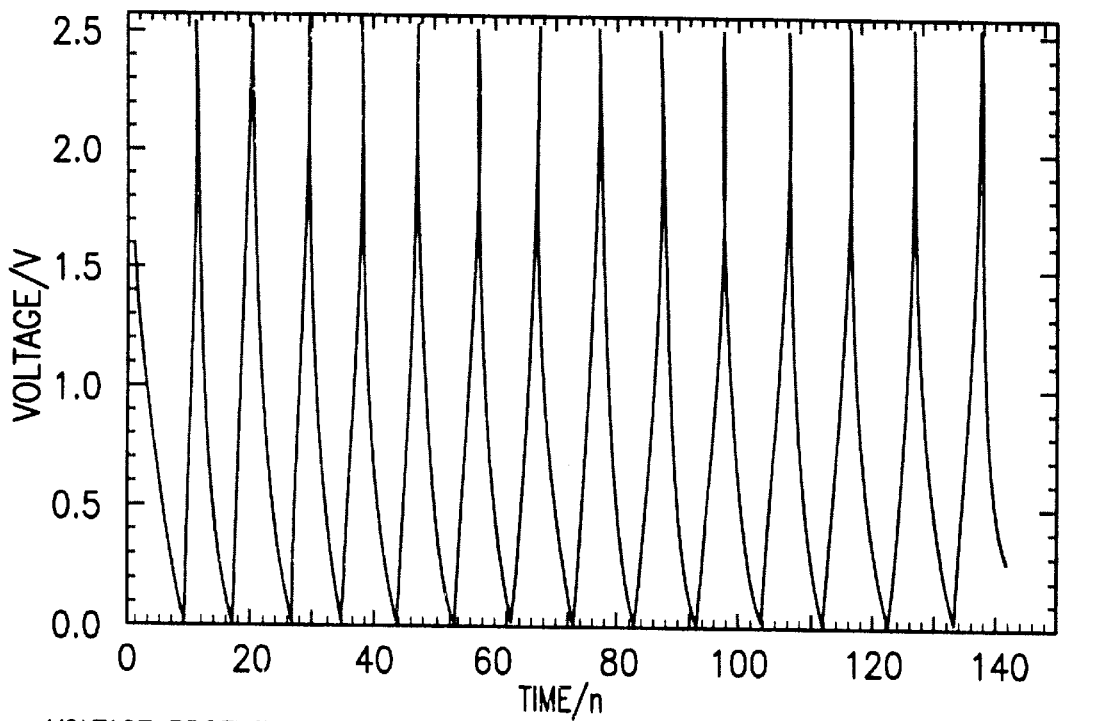
FIG. 4 is a graphical representation of the voltage profile of a carbon electrode derived from the sepiolite/polypropylene construction as it varies with time.
Figure 5:
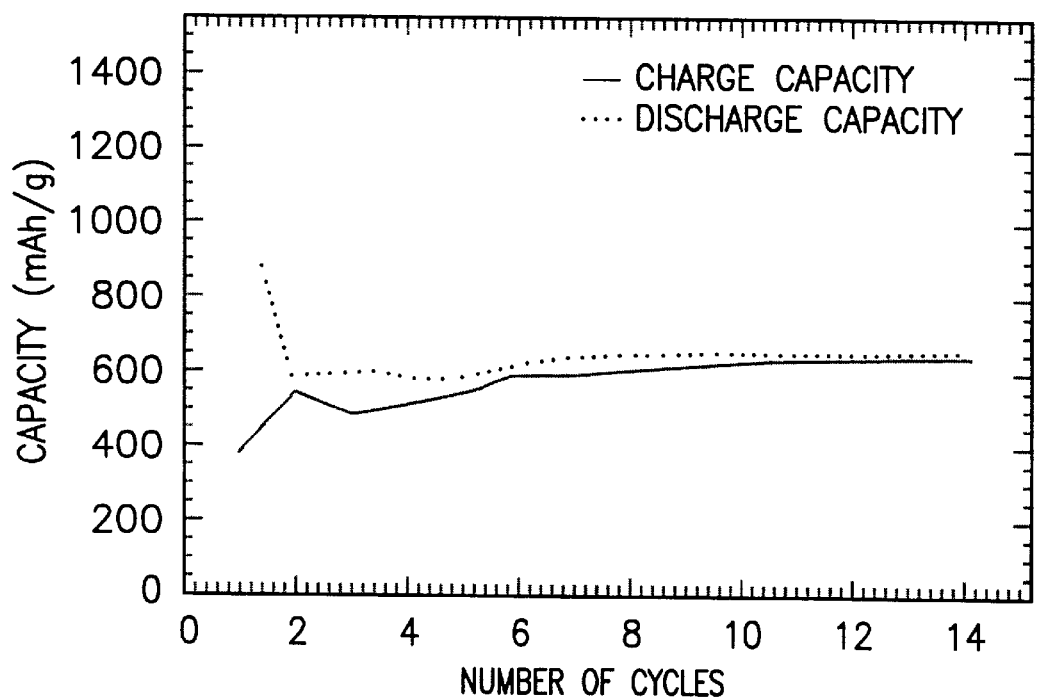
FIG. 5 is a graphical representation of the capacity performance as a function of cycle number of the carbon electrode derived from a sepiolite/polypropylene structure wherein the voltage limit is between 0 to 2.5 volts and the current rate is C/20.

FIG. 4 shows a voltage performance plot of fourteen cycles of a carbon electrode prepared as described earlier. Both the discharging and the charging cycles were run at a constant current rate C/20 or 18.6 mA/g. The first discharge capacity was higher than the subsequent cycles because lithium foil was used as the negative electrode, but the columbic efficiency for the remaining cycles was higher than 90%. The specific discharge capacity at the end of the $14^{th}$ cycle corresponds to 633 mAh/g, 1.70 times higher than the capacity delivered by graphitic carbon, assuming 100% efficiency. There was some hysteresis in voltage. FIG. 5 shows the capacity performance as a function of cycle number. There was not a significant capacity fade upon cycling and the irreversible capacity (discarding the first cycle) corresponds to 115 mAh/g.

Table 1 shows a comparison of several carbon electrodes prepared by different carbon precursors. With the exception of carbons prepared by PILC/pyrene, the results were reported for the first and second cycle number only. The performance of the carbon anodes made according to the present invention is satisfactory for lithium-ion applications, taking into account the specific capacity delivered and stability of the cells upon cycling.

TABLE I

Specific capacities of several carbon electrodes in lithium ion cells.

| Carbon from | Specific Capacity (mAh/g) | Reference |
| --- | --- | --- |
| Polyfurfuryl alcohol | 450 | Omaru et al. (14) |
| Boron-doped graphite | 430 | Way and Dahn (15) |
| Pyrolyzed siloxanes polymers | 600* | Wilson et al. (16) |
| Mesophase pitch from coal-tar | 407 | Matsumura et al. (17) |
| Mesocarbon microbeads | 750* | Mabuchi et al. *(18) |
| Argonne Premium coal samples | 589** | Zheng et al. (19) |
| PILC/pyrene | 825 | Sandi et al. (9) |
| Pyrolyzed Sugar | 575* | Xing et al. (20) |

*Irreversible capacity higher than 50% observed.
**Highest reversible capacity exhibited by Illinois #6. Irreversible capacity of 37% observed.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of preparing an anode material, comprising providing sepiolite clay having channel-like interstices in its lattice structure, depositing carbonaceous material in the channel-like interstices of the sepiolite clay, removing the sepiolite clay leaving the carbonaceous material, and forming the carbonaceous material into an anode.

2. The method of claim 1, wherein sepiolite clay is heated in an enclosure in the presence of flowing gas for a time sufficient substantially to fill the channel-like interstices of the sepiolite.

3. The method of claim 2, wherein the flowing gas is ethylene, propylene or mixtures thereof.

4. The method of claim 2, wherein the gas molecule is smaller than about 3.6 Å×about 10.6 Å.

5. The method of claim 1, wherein the carbonaceous material is a disordered carbon having a surface area of about 10 m$^2$/gm.

6. The method of claim 1, wherein the sepiolite is removed with HF or HCl acids.

7. The method of claim 1, wherein the carbonaceous material is mixed with a binder and pressed into a predetermined anode shape and thereafter dried at elevated temperature.

8. The method of claim 7, wherein the drying is at about 80° C. in a vacuum.

9. The method of claim 7, wherein the carbonaceous material and binder are pressed at a pressure of about 2000 psi.

10. The method of claim 7, and further comprising forming a slurry of the carbonaceous material and binder, drying the slurry at elevated temperature and thereafter pressing into a predetermined anode shape.

11. An anode for a lithium-ion battery, comprising compacted disordered carbon having a particle distribution corresponding to sepiolite channel-like structure.

12. The anode of claim 11, wherein the anode is a disc.

13. The anode of claim 11, wherein the carbon has a surface area of about 28 sq. m/gr.

14. The anode of claim 11, wherein the carbon has an average pore radius of about 6.6 Å.

15. The anode of claim 11, wherein the carbon has a micropore volume of about 2.11 cu. cm/gm.

16. The anode of claim 11, wherein the carbon has a micropore area of about 4.01 sq. m/gr.

17. The anode of claim 11, wherein the carbon has a meso-pore area of about 24 sq. m/gr.

18. A battery comprising a cathode including lithium, an anode separated from said cathode by an electrically non-conductive material; and an electrolyte; wherein said anode includes compacted disordered carbon having a particle distribution corresponding to sepiolite channel-like structure.

19. The battery of claim 18, wherein electrolyte is present in the cathode.

20. The battery of claim 18, wherein electrolyte is present in the anode.

21. The battery of claim 18, wherein electrolyte is present in the anode and cathode.

22. The battery of claim 21, wherein the electrolyte include LiPF$_6$.

23. The battery of claim 22, wherein the electrolyte is dissolved in ethylene carbonate and dimethylcarbonate.

24. The battery of claim 22, wherein the cathode contains Li foil.

25. The battery of claim 24, wherein the battery includes a wetting agent in the cathode and anode.

26. The battery of claim 25, wherein the wetting agent is 1,2 dimethoxyethane.

27. The battery of claim 25, wherein the electrically non-conductive material is a resin membrane.

28. The battery of claim 26, wherein the membrane is polypropylene.

29. The battery of claim 18, wherein said compacted disordered carbon has a surface area of about 28 sq. m/gr. and an average pore radius about 6.6 Å.

30. The battery of claim 29, wherein said compacted disordered carbon has a micropore volume of about 2.11 cu-cm/gm and a micropore area of about 4.01 sq. m/gr. and a meso-pore area of about 24 sq. m/gr.

\* \* \* \* \*